Patented Aug. 3, 1943

2,325,611

UNITED STATES PATENT OFFICE 2,325,611

CATALYTIC TREATMENT OF HYDROCARBON OILS

George M. Keranen, Homewood, Ill., assignor to Standard Oil Company, Chicago, Ill., a corporation of Indiana Application December 23, 1940, Serial No. 371,221

10 Claims. (Cl. 196—52)

This invention relates to the process of treating or converting hydrocarbon oils with catalysts in powdered form and the invention relates more particularly to the cracking of heavy hydrocarbon oils to produce motor fuels of the character of gasoline. The invention also relates to the catalytic treatment of naphthas and gasoline of low knock rating to increase the knock rating of these stocks.

One object of the invention is to obtain a more efficient utilization of the catalyst in the powdered catalyst conversion process than has heretofore been obtainable. Another object of the invention is to provide a method for simultaneously employing catalyst of both fine and coarse state of subdivision without sacrificing the catalytic effectiveness of either the fine or the coarse catalyst. Still another object of the invention is to provide a method for systematically discarding from the conversion system that part of the catalyst which is most nearly exhausted and retaining within the system that part of the catalyst which is most recently admitted thereto and which has undergone a minimum degradation. Other objects of the invention will become apparent from the following description thereof.

Figure 1:
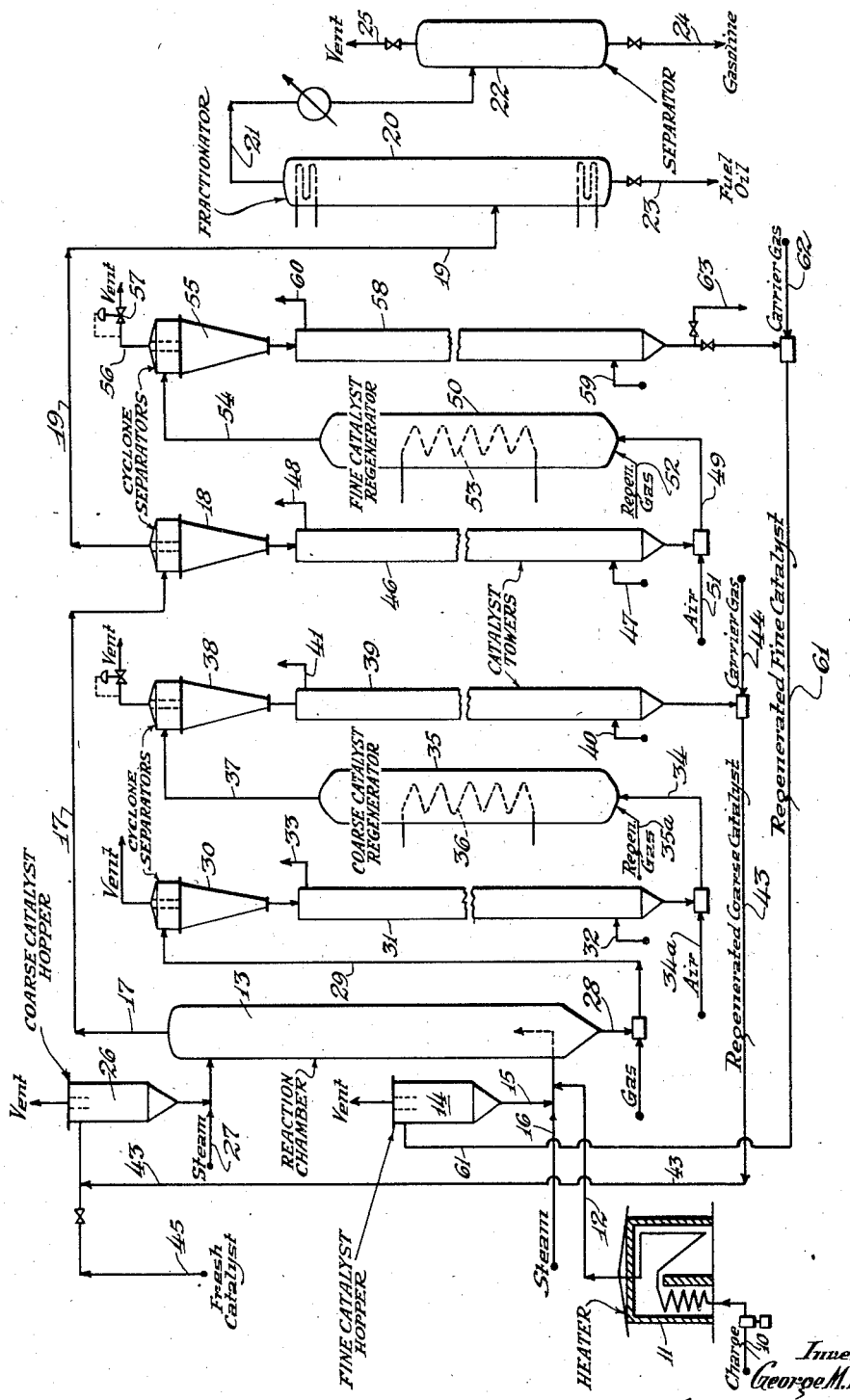
Figure 2:
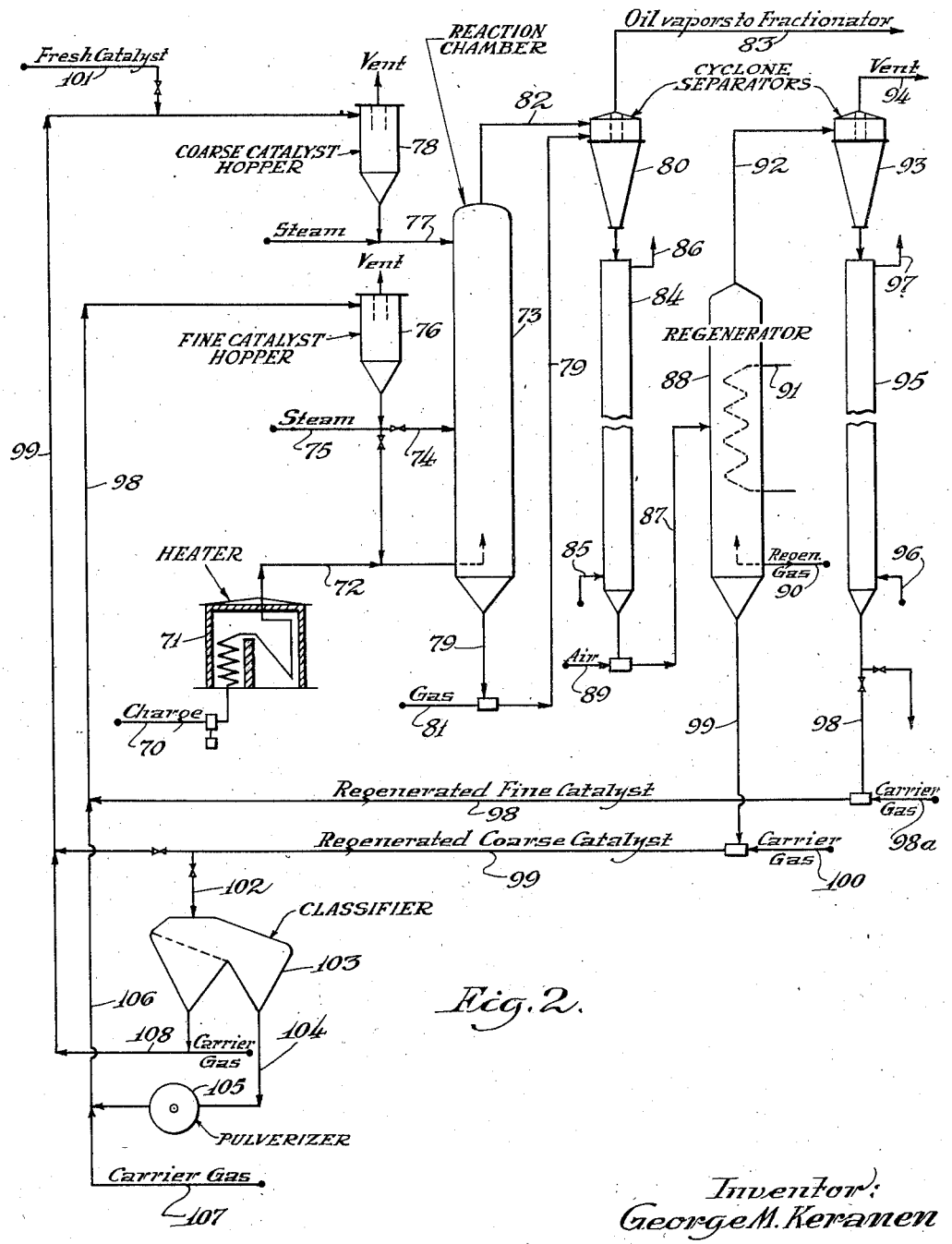

The invention is illustrated by drawings which form a part of this specification in which Figure 1 shows a diagrammatic elevation of an apparatus suitable for carrying out the process and Figure 2 shows another diagrammatic elevation of a modified apparatus employing a single regenerator for both fine and coarse catalyst and also providing a classifier for eliminating from the system catalyst which is coarser than desired.

In the conversion of hydrocarbon oil using powdered catalysts, it has heretofore been the practice to vaporize the oil, heat the vapors to the desired elevated conversion temperature and mix with the vapors the desired amount of catalyst, for example, about 1 to 10 parts of catalyst per part of oil. In order to increase the time of contact between catalyst particles and oil vapors, the vapors and dispersed catalyst have been introduced near the bottom of an elongated vertical reaction tower in which the vapor velocities were held sufficiently low to permit relative settling or sedimentation of the catalyst in the tower with respect to the vapor stream. In this manner the catalyst was retained in the reactor for a longer period of time than were the vapors and thus a more complete utilization of the catalyst was obtainable in a given volume of reaction space than would have been obtained had the catalyst and oil vapors been passed through the reactor at or near the same velocity as would occur in the case of horizontal reactors or in the case where the catalyst travelled faster than the vapors, as in downflow reactors.

One difficulty with the reactor employing retarded settling, however, lay in the fact that the time of contact (catalyst residence time) between the hydrocarbon vapors and large and small catalyst particles could not be separately controlled as is desirable to compensate for the greater surface of the fine catalyst which leads to more rapid exhaustion. In order to avoid this difficulty, it has frequently been necessary to employ catalysts of relatively uniform particle size and this has necessitated charging the process with a more expensive catalyst than would have been the case where powdered catalyst of indiscriminate particle size was used.

Powdered catalysts commonly range from particles of about 80 mesh downward to 400 mesh and finer, although sometimes catalysts of 30–40 mesh are classed as powdered. Excessively fine catalyst is generally undesirable because of the difficulty of retaining it in the system, recovering it from the spent reaction gases and regeneration gases, etc. Consequently, the tendency has been to avoid, as far as possible, those methods of handling the catalysts which result in the breakdown of particles. In prior processes employing powdered catalysts, there has also been the problem of eliminating the catalyst from the system when its efficiency has fallen to an uneconomical point. In order to obtain satisfactory economy in operation, it is generally necessary to regenerate and recycle the catalyst many times in the process before it may be discarded. Consequently, when fresh catalyst is added to the system at intervals to maintain catalyst efficiency, it has been substantially impossible to avoid discarding some relatively fresh catalyst along with the spent catalyst. In my process, however, I avoid this difficulty by charging to the system only coarse catalyst and discharging from the system only the fine catalyst segregated in the system.

According to my process, I employ catalyst of indiscriminate particle size, generally much coarser than previously employed, and, I effect a segregation of the coarse catalyst from the fine catalyst in various parts of the conversion system. The coarse catalyst is also contacted with the hydrocarbon vapors under different conditions from those applied to the fine catalyst, thereby obtaining more efficient use of both coarse and fine catalyst.

My process can be applied to various hydrocarbon conversion processes such as cracking heavier oils to gasoline, reforming low knock rating gasoline and naphthas such as straight-run naphtha, aromatization in the presence of hydrogen, etc. It will be described as it is applied to cracking.

Referring to Figure 1 of the drawings, the charging oil may be a typical distillate gas oil, for example, having a boiling range of about 425 to 750° F., which is charged by line 10 to heater 11 where the oil is vaporized and heated to the desired conversion temperature, for example, 850 to 1050° F. The vapors are conducted by transfer line 12 to a point near the bottom of reaction chamber 13. Before entering the reaction chamber, fine powdered catalyst is admitted to the hydrocarbon vapor stream from fine catalyst supply hopper 14, the catalyst flowing through line 15 and being conveyed to the reactor 13 by a current of inert gas or steam introduced by line 16 or by the vapors in line 12.

Reaction chamber 13 is constructed with sufficient volume to provide the desired time of reaction between the fine catalyst particles and the vapor stream. The reaction time required for proper utilization of the very fine catalyst may be about 1 to 10 seconds, more or less, depending largely on the nature of the catalyst employed. For example, the reaction time may be ½ to 2 seconds. The time in which the fine catalyst is in contact with the hydrocarbons (catalyst residence time) will be substantially the time required for the oil vapors to pass through the reaction chamber because of the very low settling or sedimentation rate of the fine catalyst employed. The fine catalyst dispersed in the oil vapors, after leaving chamber 13, is conducted by line 17 to a suitable catalyst separator such as cyclone separator 18 where the catalyst is separated from the vapors and the vapors are conducted by line 19 to suitable fractionating apparatus 20 from which the gasoline vapors are withdrawn by line 21 leading to separator 22. Oil heavier than the desired gasoline is withdrawn from the base of fractionator 20 by line 23 which may conduct it to a fuel oil reservoir. Gasoline collected in separator 22 may be withdrawn by line 24 leading to a suitable gasoline storage. Hydrocarbon gases and inert gases produced in or contaminating the system are withdrawn by vent line 25.

Returning now to reaction chamber 13, there is also introduced a second supply of catalyst from catalyst hopper 26. A small amount of steam may be introduced by line 27 to assist in obtaining rapid dispersion of the catalyst in the upper part of reaction chamber 13.

The catalyst supplied from 26 is very considerably coarser than that supplied from 14. A range of particle sizes from about 4 to 15 or 25 mesh may be employed, depending on vapor velocity in the reactor and other factors. Substantially all of the catalyst introduced by line 27 will sediment or settle downwardly through reactor 13 countercurrent to the upflowing hydrocarbon vapors. At the bottom of reactor 13 the coarser catalyst is collected and withdrawn by line 28 from which the catalyst is conveyed by line 29 to the regenerator. An inert gas such as nitrogen or flue gas may be employed for conveying the catalyst to the regenerator and in this case it is desirable to employ a cyclone separator 30 to eliminate most of the gas from the catalyst. From cyclone separator 30 the catalyst is allowed to pass to the upper end of catalyst pressure tower 31. This tower is sufficiently high to provide a head for the catalyst therein and enable it to be withdrawn from the base of the tower under a moderate pressure, sufficient to pass it through the regenerator and maintain it in fluid condition. In order to keep the catalyst free flowing in 31 a stream of inert gas may be introduced by line 32, for the purpose of aerating the catalyst powder, the gas escaping by line 33. Other means of circulating catalyst, such as a screw pump, impeller, etc. may be used.

From tower 31 the catalyst is led at a controlled rate by line 34 to regenerator 35. Air or other oxygen-containing gas may be introduced by line 34a as a conveying medium or carrier gas. An additional oxidizing gas, for example, air, may be introduced as a regeneration gas by line 35a, thereby maintaining an oxidizing atmosphere within the regenerator 35. A sufficiently high temperature is maintained within 35 to insure substantially complete combustion of the carbon contained on the catalyst particles. Excessive heating, however, must be avoided otherwise permanent loss of catalyst activity will result especially in the case of certain catalysts such as magnesia catalysts which have a relatively low temperature susceptibility. In general, the temperature of regenerator 35 may be about 950 to 1200° F. Higher temperatures resulting from the combustion of carbonaceous matter on the catalyst may be avoided in several ways, for example, by recycling regeneration gases through the regenerator or by introducing a cooling coil 36 as indicated in the drawings.

The regenerated catalyst is conducted by line 37 to cyclone separator 38 wherein it is separated from the regeneration gases. The separated catalyst is allowed to fall into regenerated catalyst tower 39 which is similar in general design to tower 31. A high column of catalyst is maintained in free-flowing condition therein by aeration gas admitted by line 40 and discharged by line 41. A pump may also be used for this purpose.

The pressure available at the base of tower 39 is a summation of the catalyst head within 39 and the pressure of separator 38 from which the catalyst is discharged into the tower. I may maintain a moderate pressure within separator 38 by means of automatic valve 42 and substantially the same pressure will be held in regenerator 35. Certain advantages result from maintaining the tower under pressure, particularly the advantage of better temperature control because of the higher volumetric heat capacity of the regeneration gases when employed under pressure. The amount of pressure maintained in regenerator 35 and separator 38 may be of the order of 5 to 15 pounds per square inch. As a result of feeding the tower 39 by catalyst under pressure, I do not need to employ catalyst towers as high as would otherwise be the case.

From catalyst tower 39, the catalyst is conveyed by line 43 back to the reaction step of the process. The catalyst may be conveyed by a carrier gas introduced at 44, and the gas separated from the catalyst again in coarse catalyst supply hopper 26. Fresh catalyst may be added to the system by line 45 as needed to make up for catalyst lost from the system. It is desirable, although not necessary, that the fresh catalyst have about the same particle size as the catalyst in coarse catalyst recycle system represented by regenerator 35 and catalyst tower 39.

Now we will consider the flow of the fine catalyst in the system. The fine catalyst which is separated from the converted hydrocarbon vapors in cyclone 18 passes into catalyst tower 46, where it is maintained in a fluid condition by aeration gases introduced at 47 and discharged at 48. From 46 the fine catalyst flows in a regulated stream by line 49 into regenerator 50. Air or other suitable carrier gas is introduced at 51 to convey the catalyst into the regenerator and in case of air, some regeneration is effected. Air or other regeneration gas is introduced by line 52 into the base of regenerator 50 and combustion of carbonaceous deposits is carried out in regenerator 50 under controlled conditions, somewhat the same as the conditions prevailing in regenerator 35. Regulation of the temperature may be assisted by cooling coil 53. Because of the finer character of the catalyst in 50, however, somewhat lower concentrations of oxygen may be employed in the regeneration gases for effecting complete regeneration.

From the regenerator 50 the catalyst is conducted in a stream of regeneration gases by line 54 to cyclone separator 55 where the catalyst is separated from the regeneration gases, the latter being discharged from the system through vent 56. Superatmospheric pressure may be maintained in cyclone separator 55 and regenerator 50 by automatic relief valve 57 placed in vent 56, thereby facilitating regeneration of the catalyst in 50 and also permitting the catalyst to be discharged from cyclone 55 under a pressure in a manner similar to the operation of cyclone 38 hereinabove described.

The separated fine catalyst flows from cyclone 55 into catalyst tower 58 where sufficient head of catalyst is maintained to set up at the bottom of the tower sufficient pressure for recycling to the conversion system. The catalyst in 58 is maintained in fluid condition by continuously or intermittently introducing aeration gas through line 59 discharging through line 60.

From tower 58 the catalyst flows by line 61 to catalyst supply drum 14 previously described. To assist in conveying the catalyst through line 61 carrier gas may be introduced by line 62 and separated at the vent in supply drum 14.

In ordinary practice, the amount of catalyst lost with regeneration gases through vents 42 and 57 is sufficient to permit new catalyst to be added to the system at 45 at a rate sufficient to maintain catalyst activity at the desired point. Where a higher level of catalyst activity is desired, however, this may be obtained by discharging the fine catalyst at any desired rate through discharge line 63. Some catalyst is generally lost from the system in the gases passing through line 19 to fractionator 20, this material being collected as a slurry in the reflux from the fractionator and discharged by line 23 with the fuel oil. If desired, it may be recovered by filtration or settling and returned to the system.

I have referred hereinabove to the catalyst in recycle lines 43 and 61 as coarse and fine respectively and these terms are employed with considerable reservation. It should be understood that in ordinary operations the "coarse" catalyst recycle will contain some material as fine as that contained in the "fine" catalyst recycle and vice versa. It is not essential that there be a sharp separation between the coarse and fine catalyst with respect to particle size. The degree of separation will depend primarily on the operation of reactor 13. At higher vapor velocities in 13 relatively more of the coarser catalyst will be carried over through line 17 and thence into the fine catalyst recycle system whereas at lower vapor velocities relatively more of the fine catalyst will be permitted to settle in reaction chamber 13 and flow therefrom through line 29 into the coarse recycle system. In the operation of my process, therefore, I aim to maintain the conditions within reactor 13 relatively constant especially with respect to vapor velocity, thereby effecting a relatively uniform division between coarse and fine catalyst therein. Therefore, the amount of catalyst withdrawn at 17 and 29 respectively may be equal or may be adjusted to almost any desired ratio, for example, from 2 to 5 times as much catalyst may be withdrawn through line 17 as through line 29 or vice versa, depending on the vapor velocities in reactor 13 and distribution of particle size of the catalyst.

The particle size of the coarse catalyst will ordinarily be within the range of about 4 to 50 mesh, depending on velocity conditions, whereas the fine catalyst will have a particle size generally within the range of about 15 to 200 and up to 400 mesh and finer, again depending on vapor velocity in the reactor. As indicated hereinabove, however, this division of particle size may be altered very considerably, depending on operating conditions.

In the case where high velocities are employed in the reaction zone, the conditions of hindered settling of catalyst particles therein becomes less important than at low velocities and as a result classification of coarse and fine catalyst becomes more effective. At the higher velocities, therefore, I may introduce at the top of the reactor a catalyst having somewhat smaller particle size than when employing low vapor velocities in the reactor. Thus, at vapor velocities of about 15 to 25 feet per second or as high as 40 feet per second, the coarse catalyst introduced at the top of the reactor may be about 10 to 30 mesh or even 50 mesh and simultaneously under these conditions the fine catalyst may have a particle size of about 40 to 200 mesh or finer, e. g., 300 to 400 mesh. Some overlapping of particle size inevitably results.

Where the vapor velocities are lower, for example, of the order of 3 to 10 feet per second, and up to 15 feet per second, I may introduce at the top of the reactor a catalyst with particle size of 4 to 10 mesh or even 15 mesh while the fine catalyst will be essentially the same as previously, including somewhat coarser material of the order of 15 to 25 mesh. These numerical values are given by way of example and do not limit the scope of my invention which involves broadly the process of counterflowing catalyst of fine and coarse grade in a single upflow reaction chamber.

Referring to Figure 2 the charge oil is admitted at 70 and is vaporized and heated in heater 71, the vapors then passing by line 72 into the base of reactor 73. Fine catalyst may be introduced into the vapor line 72 where it is dispersed in the vapors and travels with them upwards throughout the length of the reactor. A part or all of the fine catalyst may be introduced by line 74 at an intermediate point in the reactor 73, if desired. It is usually advantageous to have steam present in the reaction and a current of steam may be used conveniently for injecting the powdered catalyst stream, the steam being admitted by line 75. The fine catalyst may be withdrawn from supply reservoir 76.

Coarse catalyst is introduced at the top of reactor 73 by line 77 leading from coarse catalyst supply 78. The coarse catalyst falls through reactor 73 countercurrent to the rising hydrocarbon vapors therein and is withdrawn from the reactor by line 79 which conveys it to cyclone separator 80. A carrier gas may be introduced at 81 to facilitate catalyst flow through 79, or a pump or other means may be used for catalyst transfer.

The converted vapors of hydrocarbon with suspended fine catalyst are withdrawn at the top of reactor 73 by line 82 leading to cyclone separator 80 wherein both fine and coarse catalyst are separated from the vapors, the oil vapors passing by line 83 to fractionator and gasoline recovery system not shown but arranged similar to that of Figure 1.

The coarse and fine catalyst together flow from cyclone 80 into the top of catalyst tower 84 where it is maintained in a fluid condition by aerating gas introduced at 85 and discharged at 86. The catalyst is withdrawn at the base of 84 under superatmospheric pressure generally of 10 to 30 pounds per square inch and thence by line 87 to regenerator 88. Air may be introduced at 89 into line 87 as a carrier gas and to initiate regeneration of the catalyst by combustion of carbonaceous deposits. Additional regeneration gas is introduced into 88 by line 90. Excess heat of regeneration may be removed from regenerator 88 by cooling coil 91 or by recycling regenerated catalyst, inert gases, or by other suitable means.

It is preferred to regulate the vapor velocity of the regeneration gases in 88 in such a way that segregation of the catalyst into coarse and fine particles is effected. Under the preferred conditions of operation substantially the same degree of segregation is obtained in regenerator 88 as in reactor 73, i. e., if conditions of reactor 73 result in a segregation rate of 1-1 in coarse to fine catalyst in 73, it is preferred that the same ratio, 1-1, be obtained in regenerator 88. This may be accomplished readily by controlling the vapor velocities in 88, for example, by recycling spent regeneration gas therein.

From regenerator 88 the spent regeneration gases carrying fine catalyst pass by line 92 to cyclone separator 93 where spent regeneration gases are eliminated by vent 94. Fine catalyst flows from separator 93 into catalyst standpipe 95 where it is maintained in a fluid condition by suitable aeration gas introduced at 96 and eliminated at 97. From the base of catalyst tower 95 the catalyst is conducted by line 98, if desired with the aid of carrier gas introduced at 98a back to fine catalyst supply 76 from where it re-enters the hydrocarbon conversion system previously described.

From the base of regenerator 88 the coarse catalyst is withdrawn by line 99, if desired, with the aid of carrier gas introduced at 100, back to coarse catalyst supply reservoir 78. Makeup fresh catalyst may be introduced into the system at 101, the particle size of the catalyst being selected to be about the same as the coarse catalyst recycled in the system. As the catalyst is recycled, it becomes finer and finer due to unavoidable attrition in the system and eventually it reaches a state of subdivision of sufficient fineness to escape the usual recovery means such as cyclone separators or electrostatic precipitators. This very fine catalyst is continually lost from the system mostly through vapor line 83 and regenerator gas vent 94. However, by continually supplying catalyst to the system in the coarse state, that catalyst which is lost from the system is mostly catalyst which has become permanently degenerated due to many recycles in the system and, therefore, its recovery is not of much economic importance.

Under certain conditions of operation there is a tendency for the catalyst to become agglomerated to some extent, thereby forming larger particles than desired, leading to erosion of equipment and other difficulties. In order to prevent the accumulation of agglomerates in the system, I may bypass a part or all of the coarse catalyst from recycle line 99 through line 102 into classifier 103 where any agglomerates coarser than desired in the coarse catalyst recycle system are screened out or separated by other means and are conducted by line 104 to pulverizer 105 and thence by lines 106 and 98 to the fine catalyst supply 76. Carrier gas may be introduced at 107 if desired. The properly graded coarse catalyst from classifier 103 may be conducted by line 108 and line 99 to the coarse catalyst supply 78.

Instead of using a combination regenerator and classifier as described for 88, I may employ a suitable high velocity upflow regenerator in which all the catalyst, both fine and coarse, is introduced near the bottom and carried out the top to two cyclone separators connected in series, the coarse catalyst being segregated in the first cyclone separator and the fine catalyst in the second. Coarse and fine catalyst may then be recycled in the system through effective repressuring means such as catalyst standpipe towers, one for the coarse and one for the fine. This arrangement is an obvious modification of the design shown in Figure 2 and is not described in the drawings.

The catalysts I employ are the refractory, solid oxides of various metals, usually a mixture of two or more oxides such as silica and alumina, silica and magnesia, and oxides of metals of groups V and VI. Silica gel or other active silica may be promoted with active alumina, magnesia, beryllia, etc. Molybdena or chromia may be used on alumina. Clays, fuller's earth, bentonite, etc. may be activated by acid and form especially good cracking catalysts.

Having thus described my invention what I claim is:

1. The process of treating hydrocarbon oils with a powdered catalyst, comprising employing a catalyst having a wide range of particle size, contacting hydrocarbon vapors at conversion temperatures with said catalyst in a vertical, elongated reaction zone, introducing the finder constituents of said catalyst with said vapors near the bottom of said reaction zone, introducing the coarser constituents of said catalyst near the top of said reaction zone, flowing said hydrocarbon vapors upwardly through said reaction zone, regulating the velocity of said vapor flow to permit settling said coarse catalyst countercurrent to said vapors, withdrawing said vapors and fine catalyst dispersed therein from the top of said reaction zone, withdrawing coarse catalyst from the bottom of said reaction zone, separating the catalyst from treated hydrocarbon vapors, regenerating said coarse and fine catalyst by controlled combustion with oxygen-containing gas to remove carbonaceous deposits, recycling coarse catalyst to the top of said reaction zone and recycling said fine catalyst to the hydrocarbon vapors near the bottom of said reaction zone.

2. The process of claim 1 wherein coarse and fine catalyst streams are separately regenerated.

3. The process of claim 1 wherein coarse and fine catalyst streams withdrawn from said reaction zone are united, simultaneously regenerated and then reclassified before recycling to said reaction zone.

4. The process of converting hydrocarbon oils by the action of powdered catalysts comprising heating and vaporizing said oils and passing the vapors thereof upwardly through an elongated, vertical reaction zone, introducing coarsely powdered solid conversion catalyst at an elevated point in said reaction zone, introducing finely powdered solid conversion catalyst at the lower part of said reaction zone and dispersing it in said hydrocarbon vapors, maintaining the velocity of said vapors below the settling rate of said coarsely powdered catalyst and above the settling rate of the said finely powdered catalyst, whereby the fine catalyst is carried through said reaction zone in suspension in said vapors effecting concurrent conversion thereof simultaneously with countercurrent contacting of said vapors by said coarse catalyst descending through said reaction zone, withdrawing catalyst and hydrocarbon vapors from said reaction zone and separating the spent catalyst from said hydrocarbons, fractionating said hydrocarbons to recover high knock rating gasoline therefrom, regenerating said separated catalyst by controlled combustion with oxygen-containing gases whereby carbonaceous deposits are removed and recycling the regenerated catalyst to said reaction zone.

5. The process of claim 4 wherein the mixture of said spent catalyst is charged to an intermediate point in a vertical, elongated regeneration zone and regeneration gases are passed upwardly through said regeneration zone at a velocity intermediate between the settling rate of coarse catalyst and fine catalyst, thereby permitting coarse catalyst to settle to the bottom of said regeneration zone and fine catalyst to be carried by said regeneration gases to the top of said regeneration zone, separating the regeneration gases from said regenerated catalyst and recycling the regenerated coarse catalyst and fine catalyst back to said reaction zone.

6. The process of claim 4 wherein the spent coarse and fine catalyst is combined and regenerated in a single regeneration zone by the action of oxygen-containing gases under conditions of controlled combustion, regenerated catalyst is graded into a coarse and a fine grade and the grading is controlled to adjust the particle size of said coarse and fine grades of catalyst to be substantially the same, respectively, as the said coarse and fine catalyst charged to said reaction zone.

7. In the process of converting hydrocarbon oils by contacting the vapors at elevated conversion temperature with dispersed powdered solid catalyst and thereafter separating the catalyst from the hydrocarbon vapors and regenerating the spent catalyst by controlled combustion with oxygen-containing gases, after which the catalyst is recycled in the process, the method of recycling the catalyst which comprises establishing pressure on said catalyst by charging it to the top of a tower filled with catalyst and withdrawing it from the bottom of said tower under a pressure equal to the hydrostatic pressure of catalyst in the tower, regenerating the catalyst under pressure substantially equal to said hydrostatic pressure, without releasing pressure, separating the catalyst from regeneration gases and charging the regenerated catalyst to a second catalyst tower at a pressure substantially equal to the pressure of said regenerator and withdrawing and recycling catalyst from the base of said second tower at a pressure substantially equal to the combined hydrostatic pressures of said towers.

8. In the process of converting hydrocarbon oils into gasoline of high knock rating wherein the vapors of said oils are contacted at an elevated temperature with a mixture of coarse and fine powdered catalyst maintained in suspension, the coarse catalyst flowing countercurrently to the vapors and the fine catalyst flowing concurrently with the vapors and wherein the catalyst is separated from said hydrocarbon vapors, regenerated by controlled combustion with oxidizing gases and the regenerated catalyst is recycled to the conversion zone, the improvement comprising maintaining the efficiency of said catalyst by continually discarding from the system part of said finely divided catalyst and continually adding an equivalent amount of fresh coarse catalyst to the system, the supply of fine catalyst in the system being replenished by disintegration of coarse catalyst.

9. In the process of converting hydrocarbon oils into gasoline of high knock rating by the action of subdivided solid catalysts comprising both coarsely divided and finely divided catalysts, wherein the hydrocarbon vapors are contacted with said catalysts in suspension at elevated conversion temperature, and the catalysts are separated from the converted hydrocarbons, the method of extending the time of contact of said hydrocarbons with said coarsely divided catalysts beyond that of said finely divided catalyst by countercurrently contacting the hydrocarbon vapors with said coarsely divided catalyst and concurrently contacting said vapors with said finely divided catalyst simultaneously in a single vertically disposed reaction zone through which said vapors are passed in an upward direction at a velocity sufficient to prevent the separation of fine catalyst from said vapors while permitting said coarse catalyst to settle to the bottom of said zone whence it may be separately withdrawn, said fine catalyst being introduced into said reaction zone at an intermediate point thereof.

10. In the process of converting hydrocarbon oils into high knock rating gasoline by contacting the vapors of said oils at elevated conversion temperatures with a solid powdered conversion catalyst, separating the catalyst from the converted hydrocarbon vapors, regenerating the separated catalyst and recycling it in the system, the improvement comprising employing a catalyst consisting of coarse and fine grades, separately charging both grades of catalyst to the said contacting step simultaneously, separating agglomerated catalyst formed in the system from the coarse grade and pulverizing it to a size substantially equivalent to the fine grade and returning it to the system.

GEORGE M. KERANEN.